(No Model.)

C. E. MAYO & W. L. PERRY.
FOOT POWER MACHINE.

No. 245,532. Patented Aug. 9, 1881.

WITNESSES:
C. Neveux
C. Sedgwick

INVENTOR:
C. E. Mayo
W. L. Perry
BY Munn & Co
ATTORNEYS.

UNITED STATES PATENT OFFICE.

CHARLES E. MAYO AND WILLIAM L. PERRY, OF LOWELL, MASSACHUSETTS, ASSIGNORS TO THEMSELVES AND JOSEPH F. FULLER, OF SAME PLACE.

FOOT-POWER MACHINE.

SPECIFICATION forming part of Letters Patent No. 245,532, dated August 9, 1881.

Application filed April 22, 1881. (No model.)

*To all whom it may concern:*

Be it known that we, CHARLES E. MAYO and WILLIAM L. PERRY, both of the city of Lowell and county of Middlesex and State of Massachusetts, have invented certain new and useful Improvements in Foot-Power Machines, of which the following is a specification.

Our improvements relates to foot-power mechanism for driving saws, lathes, and performing work of similar character requiring small power and high speed.

The invention consists in a clutch-pulley of novel construction and a treadle arranged to act always in one direction, these parts being combined to secure continuous motion of the driven shaft, all as hereinafter described and claimed.

Figure 1:
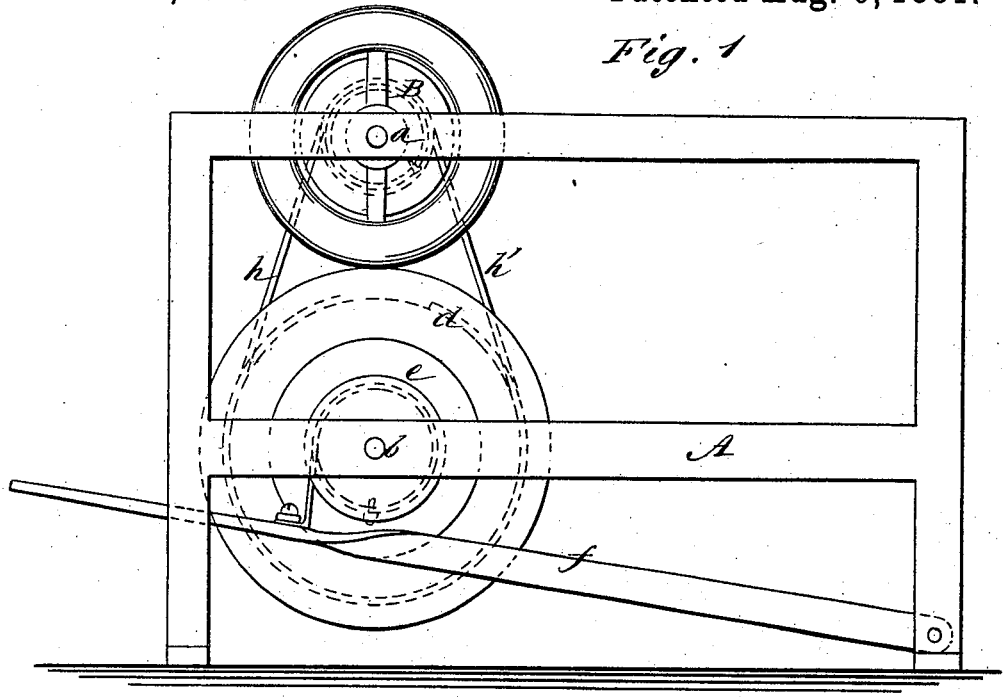
Figure 2:
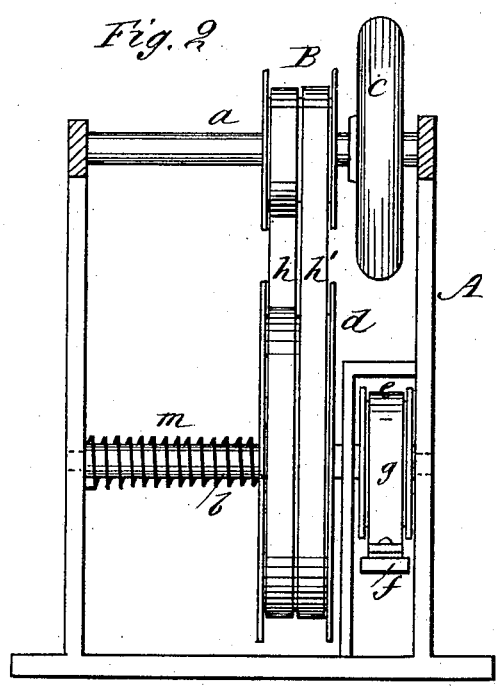
Figure 3:
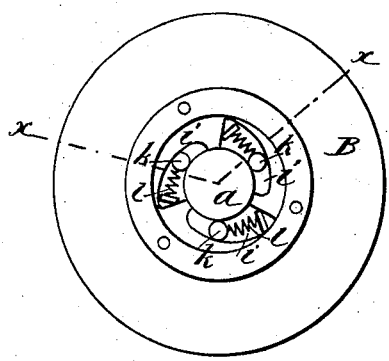
Figure 4:
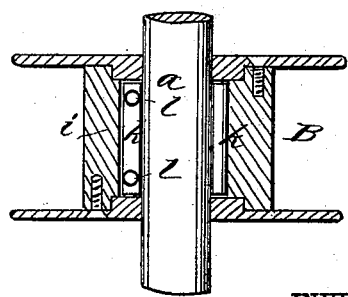

In the accompanying drawings, Figure 1 is a side elevation of the machine. Fig. 2 is an end view with the frame in section. Fig. 3 is a side view of the clutch-pulley with one side plate removed. Fig. 4 is a sectional view of the clutch on line $x\ x$ of Fig. 3.

Similar letters of reference indicate corresponding parts.

A is a frame of suitable form, carrying an upper cross-shaft, $a$, and lower cross-shaft, $b$, sustained in suitable bearings. The shaft $a$ is the driven shaft and carries clutch-pulley B and fly-wheel $c$. The treadle-shaft $b$ carries a large pulley, $d$, and smaller pulley $e$, both of which are fast.

$f$ is the treadle, hung by one end to the frame of the machine. From the treadle $f$ a strap, $g$, passes to and around the pulley $e$, and from the pulley $d$ two straps, $h\ h'$, pass to and around the clutch-pulley B. These straps $h\ h'$ are placed side by side, and are wound in opposite directions, so that they pass off at opposite sides. The ends of the straps are connected to the pulleys.

The clutch-pulley B is bored centrally for the shaft and formed at the sides of the central aperture with tangential grooves $i$, that extend from end to end of the hub and open into the bore. In the grooves $i$ are pins or rollers $k$, behind which are springs $l$, that tend to force the rollers toward the shaft $a$. There are preferably three grooves, $i$, and the rollers $k$ are of such diameter that they will jam between the shaft and the tangent sides of the grooves.

With this construction the pulley can turn freely on the shaft in one direction, and will clutch the shaft firmly when turned the reverse way. As shown, the pulley clutches when turned to the left; but that may be changed by simply reversing the pulley on the shaft.

In operation, the treadle being pressed down, the strap $g$ turns pulley $e$ and shaft $b$, and the strap $h$, being thereby wound on pulley $d$, turns the clutch-pulley B in the direction for clutching the shaft $a$. The shaft is consequently turned and continues to turn by momentum of the fly-wheel during the return movement of the clutch. This movement of the clutch by strap $h$ winds the strap $h'$ on the clutch-pulley, so that the reverse movement of the shaft $b$ will unwind strap $h'$, reverse the revolution of the clutch, and rewind strap $h$. The reversal of the movement is to be accomplished by a spring or equivalent device. As shown, there is a spiral spring, $m$, on shaft $b$, connected to the frame and to the pulley $d$. At the forward movement the spring is wound and reverses the movement of the shaft by its reaction.

It will be seen that the treadle always turns the treadle-shaft in one direction. The shaft $a$ is turned in the same direction, or the reverse, according to the arrangement of the clutch.

The clutch shown can be used with other forms of treadles and the treadle used with a clutch of different construction. We do not limit ourselves in that respect.

Having thus fully described our invention, we claim as new and desire to secure by Letters Patent—

The combination of clutch-pulley B, shaft $a$, pulleys $d\ e$, straps $h, h'$, and $g$, shaft $b$, treadle $f$, and spring $m$, substantially as shown and described, for operation as a foot-power machine as specified.

CHARLES E. MAYO.
WILLIAM L. PERRY.

Witnesses:
EDMOND L. MAYO,
GEO. F. LAWTON.